United States Patent [19]
Grinstein et al.

[11] Patent Number: 5,737,360
[45] Date of Patent: Apr. 7, 1998

[54] SYSTEM EMPLOYING CONTINUOUS-TIME DISSIPATIVE PSEUDORANDOM DYNAMICS FOR COMMUNICATIONS AND MEASUREMENT

[75] Inventors: Geoffrey Grinstein, Yorktown Heights, N.Y.; Neil Gershenfeld, Somerville, Mass.

[73] Assignee: International Business Machines, Corp., Armonk, N.Y.

[21] Appl. No.: 492,285

[22] Filed: Jun. 19, 1995

[51] Int. Cl.$^6$ .............................. H04B 15/00; H04K 1/00; H04L 27/30

[52] U.S. Cl. .............................................. 375/206

[58] Field of Search ................................ 375/200–210, 375/259, 367, 359, 377; 370/107, 515; 364/717; 371/22.4; 380/9, 43

[56] References Cited

U.S. PATENT DOCUMENTS

| | | | |
|---|---|---|---|
| 5,291,555 | 3/1994 | Cuomo et al. | 380/6 |
| 5,293,425 | 3/1994 | Oppenheim et al. | |
| 5,394,405 | 2/1995 | Savir | 371/27 |
| 5,412,665 | 5/1995 | Gruodis et al. | 371/27 |
| 5,446,683 | 8/1995 | Mullen et al. | 364/717 |
| 5,579,337 | 11/1996 | Grinstein et al. | 375/206 |
| 5,612,973 | 3/1997 | Gershenfeld | 375/206 |

OTHER PUBLICATIONS

Simon et al., "Spread Spectrum Communications Handbook", McGraw-Hill Inc. Chapter 5, Jan. 1994.
Cuomo et al., "Synchronization to Lorenz-Based Chaotic Circuits with Applications to Communications", IEEE Transactions on Circuits and Systems–II, vol. 40, No. 10, Oct. 1993
Cuomo et al., "Circuit Implementation of Synchronized Chaos with Applications to Communications", The American Physical Society, vol. 71, No. 1, Jul. 1993.

(List continued on next page.)

*Primary Examiner*—Tesfaldet Bocure
*Assistant Examiner*—Bryan Webster
*Attorney, Agent, or Firm*—Cesari and McKenna, LLP

[57] ABSTRACT

A communication and/or measurement system includes in a a transmitter an analog feedback system that modulates a pseudo-random noise signal with a message signal to produce a wideband signal for transmission. A receiver, which demodulates the wideband signal to recover the message signal, includes an associated analog feedback system that reproduces the noise signal based on the received signal. The analog feedback systems (AFS) are continuous-time generalizations of a linear feedback shift register ("LFSR"). The AFS are characterized by a function that agrees with the function that characterizes the LFSR, at the points at which that function is defined. Further, the AFS characterizing function has stable periodic orbits at these values, and the stable periodic orbits are attractors. The AFS thus produces a signal that relaxes on to a nearest periodic orbit that generalizes to continuous time the maximal sequence produced by the corresponding LFSR. The AFS in the transmitter, which operates in accordance with a harmonic oscillator, is characterized by the following differential equation:

$$\frac{dx}{dt} = \epsilon_1(x - x^3) + A\Theta(z - z_c)\cos\left(\pi\frac{1 + x(t - 1/2)}{2}\right) \times \left[1 - \cos\left(\pi\sum_{i=2}^{N} a_i \frac{1 + x(t - (2i - 1)/2)}{2}\right)\right]$$

where the $\alpha_i$'s are the coefficients of the maximum length polynomial used to produce the maximal sequence. The AFS in the receiver is characterized by the following differential equation:

$$\frac{dy}{dt} = \epsilon_1(y - y^3) + A\Theta(|S(t)| - r)\cos\left(\pi\frac{1 + y(t - 1/2)}{2}\right) \times \left[1 - \cos\left(\pi\sum_{i=2}^{N} a_i \frac{1 + y(t - (2i - 1)/2)}{2}\right)\right] + \epsilon_2(S(t) - y(t))$$

10 Claims, 6 Drawing Sheets

OTHER PUBLICATIONS

Wu et al., "A Simple Way to Synchronize Chaotic Systems With Applications to Secure Communication Systems", International Journal of Bifurcation and Chaos, vol. 3, No. 6, 1993.

Kevin M. Cuomo, "Synthesizing Self–Synchronizing Chaotic Systems, International Journal of Bifurcation and Chaos", vol. 3, No. 5, 1993.

5,737,360

1

SYSTEM EMPLOYING CONTINUOUS-TIME DISSIPATIVE PSEUDORANDOM DYNAMICS FOR COMMUNICATIONS AND MEASUREMENT

RELATED APPLICATION

This system is a continuous-time implementation of an "analog" feedback shift register that is discussed in a related patent application entitled System Employing Dissipative Pseudorandom Dynamics For Communications And Measurement to Neil Gershenfeld filed with the United States Patent Office on Jun. 19, 1995, and filed on Jun. 19, 1995 and assigned U.S. patent application Ser. No. 08/492,285.

FIELD OF THE INVENTION

The invention relates generally to communication and/or measurement systems and, more particularly, to systems that use spread spectrum modulation to convert relatively narrow-band information, or message, signals to wide-band signals for transmission.

BACKGROUND OF THE INVENTION

Communication and measurement systems often use spread spectrum modulation techniques to modify message signals for transmission in order to lower the probability of interception, reduce the peak power of the transmitted signals, allow greater channel sharing and/or improve interference rejection. Further, such systems may also use spread spectrum techniques to produce high resolution timing or ranging information, such as, for example, in global positioning systems. Spread spectrum modulation involves conversion of a relatively narrow-band message signal into a wide-band signal by multiplying it with, for example, a "pseudo-random" noise signal. In one arrangement, such as the direct sequence spread spectrum system described herein, this involves amplitude modulation of the noise by the message.

Linear feedback shift registers (LFSR's) are typically used to produce the pseudo-random noise. An LFSR consists of N stages connected together to pass their contents forward through the register, with certain stages tapped, or connected, into a feedback path. The feedback path combines the contents of the tapped stages and feeds the combination back to one or more of the stages, to update the register.

The LFSR produces a sequence of symbols, for example, binary symbols or bits, that is periodic but appears random in any portion of the sequence that is shorter than one period. A period is defined as the longest sequence of symbols produced by the LFSR before the sequence repeats. When this pseudo-random series of symbols is modulated by the message, the result is a wide-band signal with a flat power spectrum over one period of the pseudo-random signal.

The period of the pseudo-random signal is determined by the number of stages in the shift register and by the feedback between the stages. An LFSR with "N" stages produces a signal with a period of at most $2^N-1$ bits. If the feedback of the LFSR is set up in accordance with an irreducible polynomial over GF(2), also referred to as a maximum length polynomial, the period of the LFSR is equal to this maximum value, $2^N-1$. The period can thus be made as long as desired by (i) including in the register a sufficient number of stages and (ii) combining the stages in accordance with an associated maximum length polynomial.

The pseudo-random noise is produced by first initializing the LFSR, that is, setting each of the stages of the LFSR to

2 a predetermined state, and then shifting the LFSR to produce as the output of the last stage of the register a sequence of bits. These bits are used to produce the pseudo-random noise signal, which may, for example, have signal values of −1 and +1. This signal is then modulated by the message signal to produce a signal for transmission.

A receiver demodulates, or despreads, a received version of the transmitted signal by reversing the modulation process, i.e., combining the received signal with a locally generated replica of the noise signal to reconstruct the desired message. To reproduce the noise signal, the receiver includes an LFSR that is identical to the one in the transmitter. The LFSR in the receiver must be in the same state as the one in transmitter, and it must also be operated in synchronism with the received signal, to produce the desired message. The receiver must thus determine both the state of the LFSR and a clock phase from the received signal. To do this the receiver performs cumbersome search and acquisition operations. Once the LFSR is operating in synchronism with the received signal, the receiver must perform operations that accurately track the received signal, so that the LFSR continues to operate in synchronism with the signal.

While the foregoing operations are usually applied to messages in digital, i.e., binary form, they can also be applied to analog or continuous-valued bounded messages, for example, messages whose instantaneous values lie anywhere in the range −1 to +1.

To ensure that the receiver synchronizes to and remains in synchronism with the received signal, some prior known systems use chaotic modulation signals. Synchronization, or entrainment, is ensured in a chaotic system that is non-linear, dissipative and in which the transmitter and the receiver are coupled such that their joint Lyapunov exponent is negative.

In such a communication system the transmitter generates a chaotic noise signal and modulates this signal by the message signal to produce a chaotic signal for transmission. A receiver in the chaotic system manipulates the transmitted signal, by applying that signal to its own chaotic noise signal generator, thereby synchronizing this generator to the one in the transmitter and recovering the message. An example of such a system is discussed in U.S. Pat. No. 5,291,555 to Cuomo et al.

The noise signal produced by a chaotic system is randomly driven, because of the exponential amplification of small fluctuations. The system is not an ideal noise source, however. There can be linear correlations in the signal that lead to undesirable peaks in the power spectrum that must be filtered for optimum use of available bandwidth. Further, even after filtering to flatten the power spectrum there remain non-linear correlations, which can interfere with subsequent coders or make the system more susceptible to unintended reception.

The filters required to flatten these peaks are at best complex, and may not be realistically or economically feasible. Also, the filters required in the receiver to restore the peaks are also complex and may be infeasible. If so, the transmitter may have to transmit with reduced power, which may adversely affect the reception of the signal.

Moreover, if the receiver in the chaotic system is to synchronize to the transmitted signal within a reasonable time, the message signal cannot be too large when compared to the chaotic carrier signal. If the message signal is too small, however, the transmitted signal is comprised mainly of the chaotic carrier and bandwidth is wasted.

As in any communication system, there is a trade-off between time to synchronize, or lock, to a received signal and the robustness of the system, that is, the accuracy with which the system locks to the signal and remains locked thereafter. Known chaotic systems cannot be readily altered to change in a predictable way their attractor dimensions, i.e., the usable numbers of degrees of freedom. These systems thus cannot readily alter the trade-off between time to lock and robustness.

While it is advantageous to use pseudo-random noise as a modulation signal, prior known systems that produce these noise signals use linear feedback shift registers in the transmitters and the receivers, and thus, as discussed above operate with digital messages. What is needed is a system that uses the pseudo-random noise, and operates with an analog message, to avoid problems associated with the search, acquisition and tracking of the pseudo-random noise in the received signal.

SUMMARY OF THE INVENTION

The invention is a continuous-time spread spectrum modulation system that modulates a pseudo-random noise signal with an analog message signal and includes, respectively, in its transmitter and its receiver subsystems that are analog generalizations of linear feedback shift registers. These subsystems are both non-linear and dissipative, and are coupled to each other through the transmitted signal. The system is non-chaotic and uses non-correlated (i.e., "ideal") pseudo-random noise to modulate a message. Synchronization of the transmitter and receiver in this non-linear and dissipative system is possible because of the coupling. We refer to these subsystems generally as analog feedback subsystems (AFS).

In general, the AFS is characterized by a function $A_c(x(t))$ that is a generalization of the function that adds (modulo-two) the contents of various stages of an analogous linear feedback shift register (LFSR). The differential equation $dx/dt = A_c(x(t))$ has stable periodic orbits of period $2^n-1$ consisting of alternating intervals of integer lengths, wherein $x(t)$ is either equal to 1 or $-1$. The transitions between $x=1$ and $-1$ occur at appropriate integer values of the time $t$. These transitions mimic the jumps that the associated discrete time LFSR undergoes between 1 and $-1$ at times determined by the LFSR dynamics. Thus for real-valued initial conditions, the signal $x(\epsilon)$ produced by the differential equation relaxes on to the "nearest" periodic orbit that generalizes to continuous time the maximal sequence of 1 s and $-1$ s of the corresponding LFSR. This is discussed in more detail in Section B below.

The AFS in the transmitter operates in accordance with a harmonic oscillator with unit period. The oscillator functions as a clock and is characterized by the differential equation:

$$\frac{d^2z}{dt^2} + (2\pi)^2 z(t) = 0 \quad (1)$$

with initial conditions chosen such that $z(t) = \cos(2\pi t)$ is the solution.

In the exemplary embodiment, the AFS in the transmitter is analogous to an N-stage LFSR and is characterized by the differential equation:

$$\frac{dx}{dt} = \epsilon_1(x - x^3) + A\Theta(z - z_c)\cos\left(\pi \frac{1 + x(t - 1/2)}{2}\right) \times \quad (2)$$

-continued $$\left[1 - \cos\left(\pi \sum_{i=2}^{N} \alpha_i \frac{1 + x(t - (2i-1)/2)}{2}\right)\right]$$

where $\alpha_i$'s are the coefficients of the maximum length polynomial that characterizes the LFSR and the 1-cosine factor determines the value that the signal should have at integer values of the time, $t=n$; $\Theta(z-z_c)$ equals 1 or 0 for $z>z_c$ or $<z_c$, respectively, and $z_c$ controls the values of $t$, that is, the times, at which transitions that are governed by the cosine and 1-cosine factors are allowed to occur; A is chosen such that the transitions have the appropriate magnitude to drive the signal to the binary values, e.g., if as in equation 2 the binary values are 1 and $-1$, A is chosen such that the transitions have magnitude 2; and $\epsilon_1$ is chosen to be large enough to drive quickly to the appropriate value of $x=1$ or $x=-1$ after each transition.

The transmitter AFS produces a signal the starts its transitions slightly before time $t=n$, to complete them slightly after time $t=n$. At times $t=n/2$, the signal has the same values as the binary sequence (of $-1$ and 1's) produced by the associated LFSR at the corresponding times. Between the transition times, the signal produced by the transmitter AFS is essentially constant, such that the value to which the signal is driven at $t=n$ is maintained until very close to $t=n+1$. The 1-cos factor includes a summation of the values of $x(t)$ at specified half-integer times in the past, representing the stages of the associated LFSR. This factor determines what the value of the signal should be at the next integer time $t=n$. The cosine factor is based on the previous value of the signal and the product of these two factors determines if a transition should occur. If a $-1$ to 1 transition is to occur, the product of cos and 1-cos is 2. If a 1 to $-1$ transition is to occur, the product is $-2$, and if no transition is to occur the product is 0.

The exemplary AFS produces a signal $x(t)$ with transitions between binary values of $-1$ and 1. This signal is used to modulate the message, $m(t)$, and produce a signal, $T(t)$, for transmission.

The AFS in the receiver uses a functional $A_r(x(t))$ that is derived from the functional that governs the operation of the associated AFS in the transmitter, that is, the AFS used in the transmitter to modify the message signal. This characterizing equation thus has stable periodic orbits consisting of a sequence of integer length intervals of $t$ where $x(t)$ assumes either the value 1 or $-1$ with sharp transition between 1 and $-1$ occurring at certain integer times. These periodic orbits are "attractors" and the AFS drives any values that are within a "basin of attraction" associated with a particular attractor to the corresponding periodic orbit. The receiver AFS thus produces an essentially binary-valued noise signal from an analog received signal. This eliminates quantitization errors associated with assigning binary values to the received signal during demodulation, as is required with prior known systems that use LFSRs in both the transmitter and the receiver.

The AFS in the receiver that corresponds to the AFS in the transmitter is characterized by the, following differential equation:

$$\frac{dy}{dt} = \epsilon_1(y - y^3) + A\Theta(\textit{LS}(t)\textit{I} - r)\cos\left(\pi \frac{1 + y(t - 1/2)}{2}\right) \times \quad (3)$$

$$\left[1 - \cos\left(\pi \sum_{i=2}^{N} \alpha_i \frac{1 + y(t - (2i-1)/2)}{2}\right)\right] + \epsilon_2(S(t) - y(t))$$

where A, $\epsilon_1$ and the $\alpha_i$'s are identical to those in the differential equation that characterizes the transmitter; $\epsilon_2$ is a coupling factor; and r is chosen such that the receiver AFS produces a transition in its output signal, y(t), only when a large transition occurs in the transmitter noise x(t) that constitutes part of the received signal S(t). The function of the coupling term is to drive y(t) toward the received signal S(t), and hence, to lock the phase of y(t) to that of S(t), i.e., to the transmitter noise x(t). This eliminates the need for a synchronized clock in the receiver.

The selection of a value for $\epsilon_2$ determines the degree of coupling between the transmitter and the receiver, which, as discussed in more detail below, determines how quickly synchronization is achieved and how immune the AFS in the receiver is to a corrupted received signal. The operation of the coupling circuitry is also discussed in more detail below.

The current system combines the best features of the prior known chaotic and non-chaotic systems. The current system is a non-chaotic system that uses pseudo-random noise to spread the spectrum of the message signal, and thus, has the advantage of a flat power spectrum for the transmitted signal. The current system has the advantage of not requiring the assignment of binary, or digital, values to the received signal before recovery of the message, and thus, avoids synchronization problems that may be caused by quantitization errors. Also, the current system does not require synchronized clocks, since the AFS in the receiver produces a continuous output signal that is phase locked to the received signal, and thus, to the pseudo-random noise signal, as discussed in more detail below.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

We first discuss in Section A system that includes in a transmitter and a receiver, respectively, analog feedback subsystems (AFSs). We then discuss in Section B the operative theory of a communication system that includes these transmitters and receivers.

A. A First Embodiment of the System

Figure 1:
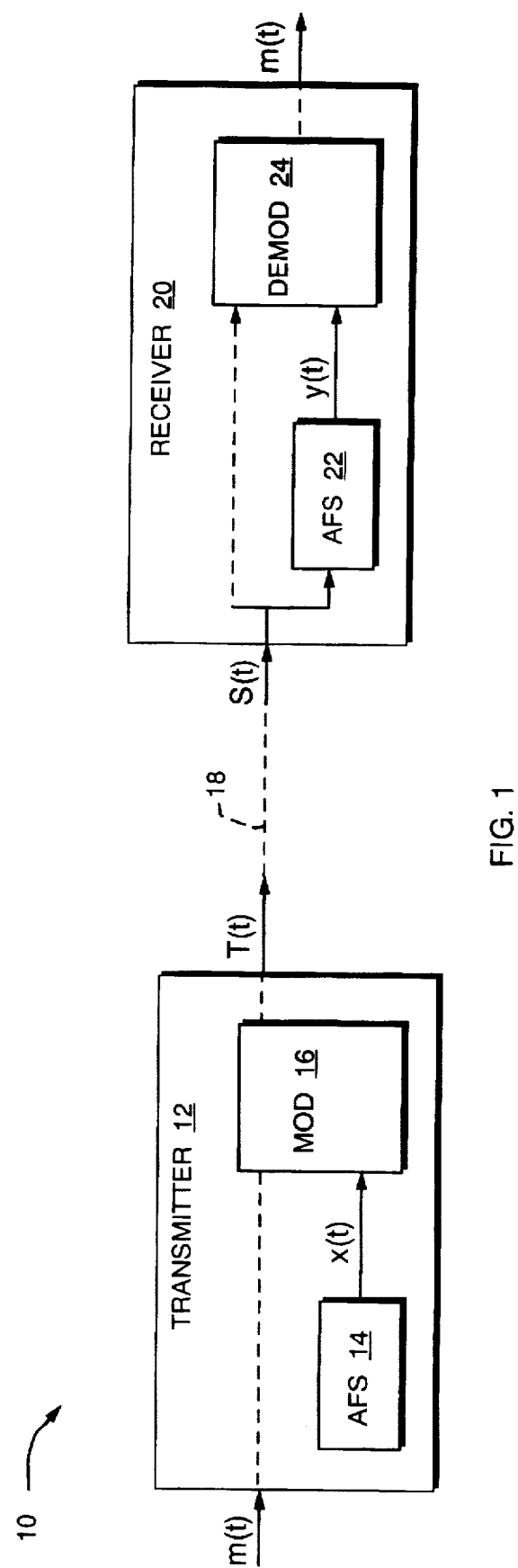
FIG. 1 is a functional block diagram of a signal transmission system constructed in accordance with the invention.

FIG. 1 depicts a signal transmission system 10 with a transmitter 12 that produces a wide-band signal, T(t), for transmission. The transmitter 12 includes an analog feedback subsystem (AFS) 14 that produces a pseudo-random noise signal x(t). A modulator 16 modulates the pseudo-random noise signal by an analog message signal, m(t), to produce $T(t)=x(t)[1+\mu m(t)]$, where $\mu$ is the modulation factor. The transmitter 12 then transmits the modulated signal T(t) to a receiver 20 over a communications channel 18. The AFS 14 is discussed in more detail with reference to FIG. 2 below.

The receiver 20 receives a version, S(t), of the transmitted signal that may include channel noise. The receiver applies the received signal to an AFS 22, which, as discussed in more detail with reference to FIG. 4 below, uses non-chaotic, non-linear feedback to reproduce a signal, y(t), that is a synchronized version of the pseudo-random noise signal x(t). A demodulator 24 uses the reproduced noise signal to recover the message signal from the received signal by calculating:

$$m(t) = \frac{S(t) - y(t)}{\mu y(t)}$$

Figure 2:
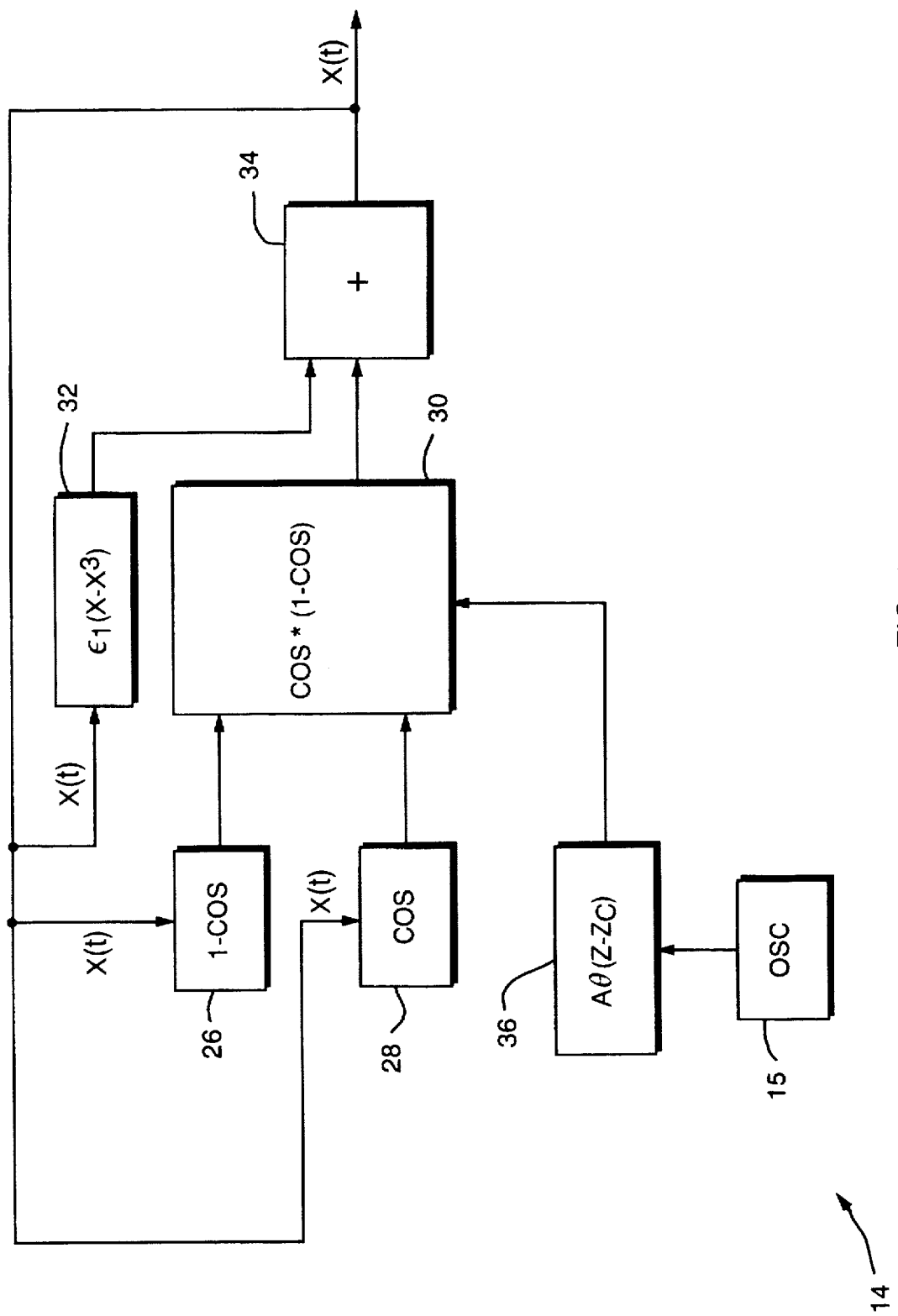
FIG. 2 is a functional block diagram that depicts in more detail an analog feedback subsystem that is included in a transmitter, which is part of the system of FIG. 1.

Referring now to FIG. 2, AFS 14 produces a signal x(t) that has at appropriate times values that correspond to the binary sequence produced by an N-stage linear feedback shift register (LFSR) that is organized in accordance with a maximum length polynomial over GF(2). The LFSR is characterized by the following update expression:

$$x_n = 2 \left( \sum_{i=1}^{N} \alpha_i \left[ \frac{x_{n-i}+1}{2} \right] (mod\ 2) \right) - 1$$

where the $\alpha_i$'s are the coefficients of the maximum length polynomial and $x_{n-i}$ is the state of the $(n-i)^{th}$ stage of the LFSR. Each time the LFSR is clocked, it produces a next bit of the pseudo-random binary sequence.

The AFS 14 operates in accordance with a harmonic oscillator 15 that is characterized by the following differential equation:

$$\frac{d^2z}{dt^2} + (2\pi)^2 z(t) = 0$$

with initial condition chosen such that the solution takes the form $z(t)=\cos(2\pi t)$. The AFS 14 is characterized by the following differential equation:

$$\frac{dx}{dt} = \epsilon_1(x - x^3) + A\Theta(z - z_c)\cos\left(\pi \frac{1+x(t-1/2)}{2}\right) \times \left[1 - \cos\left(\pi \sum_{i=2}^{N} a_i \frac{1+x(t-(2i-1)/2)}{2}\right)\right]$$

where the $\alpha_i$'s are the coefficients of the maximum length polynomial that characterizes the LFSR, and $\epsilon_1$, A and $z_c$ are constants that, as discussed in more detail below, are selected such that the output signal x(t) makes transitions between the binary values −1 and 1 at integer times, i.e., at t=n.

The factor $A\Theta(z-z_c)$ allows transitions, which are governed by the cosine and 1-cosine factors, to occur at certain integer times. It also ensures that the signal will have completed its transitions at the half-integer times that correspond to the discrete times at which the associated LFSR is defined. The function $\Theta(z-z_c)$ equals 1 or 0 for z>$z_c$ or <$z_c$, respectively. When this function has a value of 1, the second term applies "kicks" that produce the transitions in x(t). The constant $z_c$ is preferably chosen close to 1 such that the transitions occur only over intervals that include the integer times. These transitions occur where the clock value, $z(t)$, is very close to 1. The parameter A is chosen such that the transitions have the appropriate magnitude to drive $x(t)$ between the binary values 1 and −1, e.g., if the transition is from 1 to −1, A is chosen such that the transition has magnitude 2. As $z_c$ approaches 1, A approaches $\pi/\arccos(z_c)$.

The constant $\epsilon_1$ is chosen to be large enough to drive the signal, after a transition, quickly to the appropriate value of 1 or −1. It can not be too large, however, or it will tend to hold the signal at its current value and resist the transitions. The criteria for selection of this constant are discussed below with reference to FIG. 4 and a discussion of the AFS 22 in the receiver.

The cosine and 1-cosine factors of the equation that characterizes the AFS 14 determine if a transition should occur. The 1-cosine factor determines what value the signal should have after time $t=n$, based on the signal values at N specified times in the past. These values correspond to the contents of the N stages of the LFSR, and are combined in accordance with an update expression that is associated with the feedback path of the underlying LFSR. The cosine factor is determined based on the current value of the signal, and the product of the two factors determines if a transition is to occur. If a −1 to 1 transition is to occur, the product is 2. If a 1 to −1 transition is to occur, the product is −2 and if no transition is to occur, the product is 0.

The AFS 14 includes a processor 26 that continuously evaluates the 1-cosine factor, a processor 28 that continuously evaluates the cosine factor, and a processor 30 that takes the product of the evaluated cosine and 1-cosine expressions. A processor 34 adds the product produced by the multiplier 30 or a value of 0 to the product $\epsilon_1(x-x^3)$ produced by a processor 32. A processor 36 controls what is added to $\epsilon_1(x-x^3)$, by disabling the output of the processor 30 when the expression $A\Theta(z-z_c)$ has a value of 0 and enabling the output when the expression has a value of 1. The processor 34 produces as its output signal $x(t)$. This sum is then fed back to the processors 26, 28 and 32, which determine when a next transition in $x(t)$ is to occur.

Figure 3:
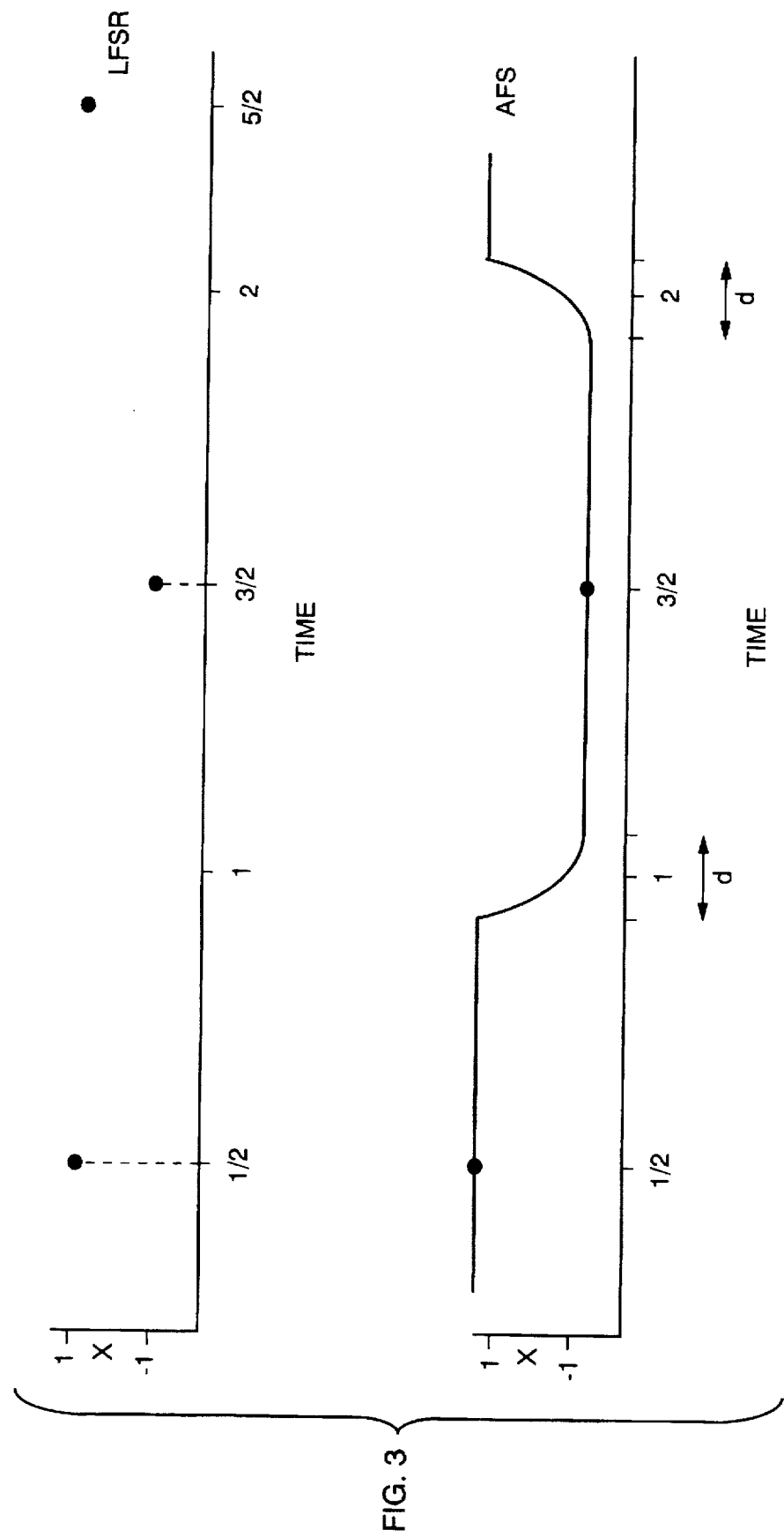
FIG. 3 is a graph depicting the output signal produced by the analog feedback system of FIG. 2.

Referring also to FIG. 3, the AFS 14 allows signal transitions to occur at integer times, i.e., when $t=n$. At times $t=n/2$, the signal produced by the AFS 14 has binary values that correspond to the binary values produced by the corresponding LFSR. The AFS uses these values of the output Signal $x(t)$ to determine if and what type of transition is required. In the example illustrated in FIG. 3, a transition occurs in the vicinity of $t=1$. The transition is not instantaneous and takes an amount of time, d, that is considerably less than one half. It is during this interval that $A\Theta(z-z_c)$ equals 1 and the kick is applied to $x(t)$.

Figure 4:
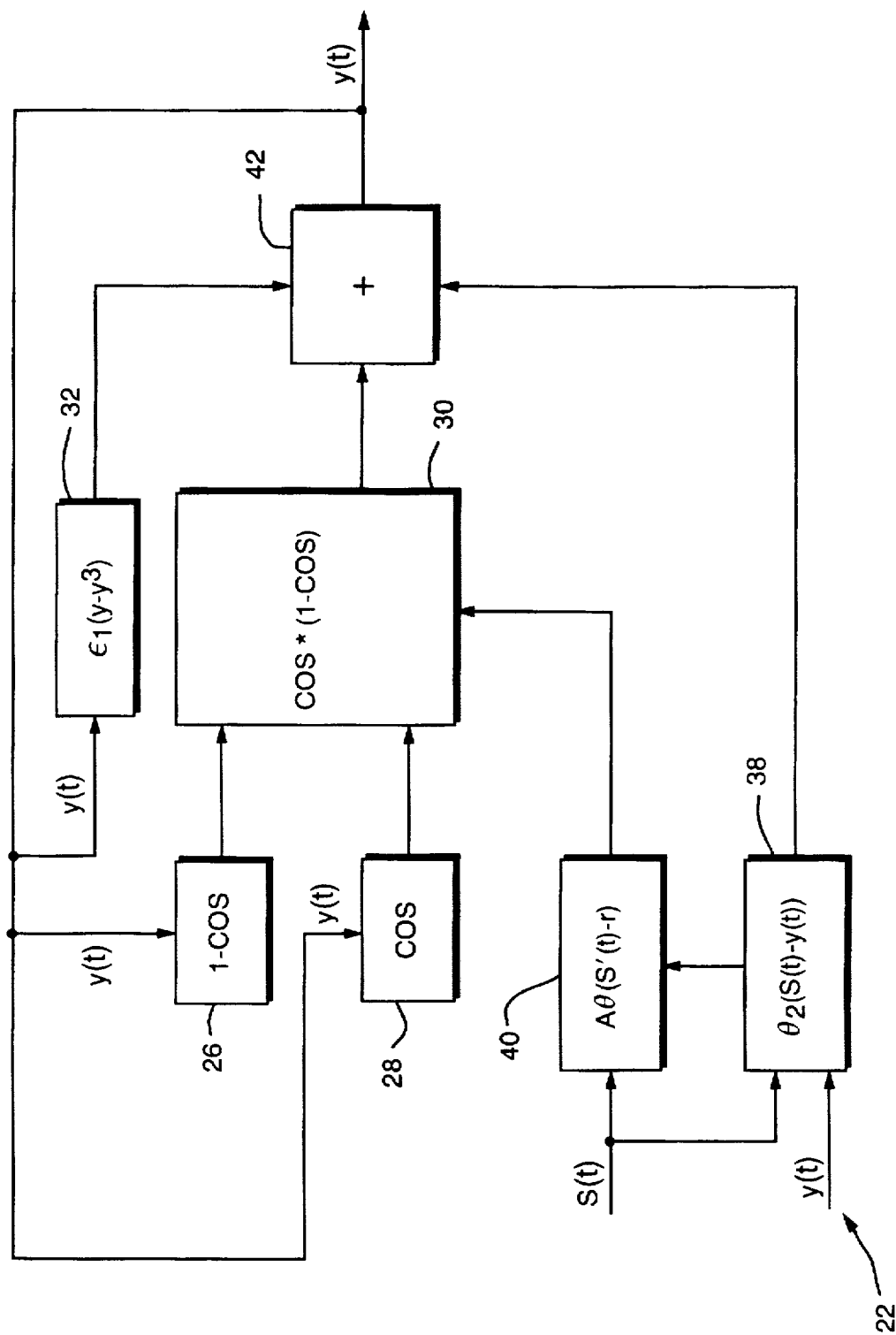
FIG. 4 is a functional block diagram of an analog feedback subsystem that is included in a receiver, which is part of the system of FIG. 1.

FIG. 4 depicts, in block diagram form, the corresponding AFS 22 used in the receiver. The AFS 22 is characterized by the following differential equation:

$$\frac{dy}{dt} = \epsilon_1(y-y^3) + A\Theta(|S'(t)|-r)\cos\left(\pi\frac{1+y(t-1/2)}{2}\right) \times$$
$$\left[1 - \cos\left(\pi\sum_{i=2}^{N} a_i \frac{1+y(t-(2i-1)/2)}{2}\right)\right] + \epsilon_2(S(t)-y(t))$$

where A, $\epsilon_1$ and the $\alpha_i$'s are identical to those in the differential equation that characterizes the AFS 14 in the transmitter (FIG. 1); $\epsilon_2$ is a coupling factor; and r is chosen such that the AFS produces a transition in its output signal, $y(t)$, only when a large transition, which is indicative of the transition in the transmitter noise, $x(t)$, occurs in the received signal $S(t)$.

As discussed in more detail in Section B, the equation that characterizes the AFS has stable periodic orbits with period $2^N-1$ at binary integer values. The periodic orbits are "attractors", and the AFS drives any values that are within a "basin of attraction" to the corresponding attractor.

The selection of a value for $\epsilon_2$ determines the degree of coupling between the transmitter and the receiver, which determines how quickly synchronization is achieved and how immune the receiver AFS is to a corrupted received signal. The term $\epsilon_2(S(t)-y(t))$ attracts $y(t)$ to the received signal and locks the phase of $y(t)$ to that of $S(t)$. The coupling factor $\epsilon_2$ can not be too large, however, or $y(t)$ will follow the small fluctuations of the message, $m(t)$. Yet, it must be large enough that this term dominates when $y(t)$ is out of synchronism with the received signal, otherwise the AFS will not synchronize to the received signal. Once $y(t)$ is in synchronism with the received signal, or at least has the same sign as the received signal, however, the first and second terms of the differential equation should dominate so that $y(t)$ undergoes transitions between 1 and −1 and does not simply track the values of the modulated signal.

The choice of a value for r depends on the relative frequencies of $m(t)$ and $x(t)$, and on the choice of $z_c$. The choice of $z_c$ sets the length of time d (FIG. 3) during which the signal $x(t)$ can undergo a transition. Since the transition has a magnitude of 2, a rough estimate of $x'(t)$ is $2/d$. Accordingly, the value of r is chosen slightly below $2/d$. The message signal, $m(t)$, typically has much lower frequencies than the pseudo-random signal $x(t)$. Accordingly, it does not change very much at all within the same length of time d. Thus, the magnitude of its derivative, $|m'(t)|$, is not as large as $|x'(t)|$. One can therefore select r well above the maximum value of $|m'(t)|$, so that the AFS responds only to transitions in the received signal that are associated with the included noise signal, $x(t)$, rather than to changes in the received signal that are attributable solely to changes in the included message signal.

The AFS 22 includes the same processors 26, 28, 30 and 32 as the AFS 14 (FIG. 2) in the transmitter. These processors produce the product of the cosine and 1-cosine factors and the first term of the differential equation. The AFS 22 further includes a processor 38 that produces the product $\epsilon_2(S(t)-y(t))$ and a processor 40 that evaluates the expression $\Theta(S'(t)-r)$. When this expression has a value of 1, the processor 40 enables the output of processor 30 and the product produced by that processor is added to the products produced by processors 32 and 38, to produce a new value of $y(t)$. When the expression $\Theta(S'(t)-r)$ has a value of 0, the output of processor 30 is disabled and the processor 42 adds the products produced by processors 32 and 38, to produce $y(t)$.

Figure 5:
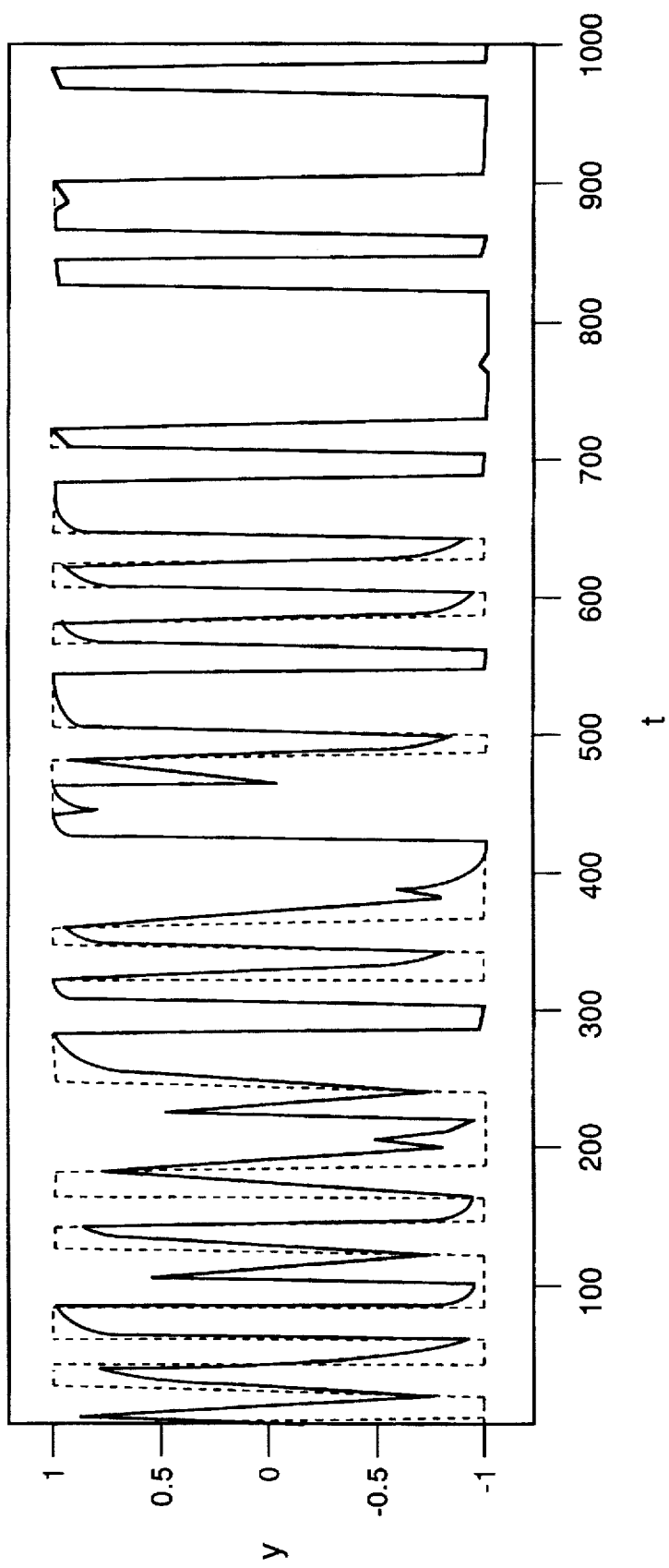
FIG. 5 is a graph depicting the operation of an illustrative system in acquiring a signal.

FIG. 5 illustrates the operation of an AFS in a receiver that has $z_c=0.8$, $\epsilon_1=0.5$, $\epsilon_2=2$, $A=4.7$ and $r=1$. The dotted line represents the values of the pseudo-random signal $x(t)$ to which the signal produced by the AFS 22 is to lock, and the solid line represents the signal $y(t)$ produced by the AFS 22.

As discussed above, the coupling factor, $\epsilon_2$, determines how much of the received signal is included in the updated output signal. When the coupling factor $\epsilon_2$ is relatively small, more of the feedback signal and less of the received signal is used in to update the signal $y(t)$. The AFS may thus take longer to synchronize. It can more easily handle a corrupted received signal, however, since less of the signal is used to update $y(t)$. There is thus a trade-off between the time it takes for the register to synchronize and the accuracy of the synchronization.

The coupling factor may be chosen to be initially relatively large, for fast synchronization, and thereafter reduced for enhanced handling of signal corruption.

Once the initial value of $\epsilon_2$ is chosen, $\epsilon_1$ is selected so that the last term of the differential equation dominates before lock, and the first and second terms dominate after lock is achieved. Thus before lock, the AFS uses mostly the received signal to update y(t), and after lock, the AFS uses less of the received signal, so that y(t) transitions between the binary values 1 or −1. The value of $z_c$ is chosen to provide an adequate time interval in which the transitions are to take place and A is chosen so that the transitions within these intervals produce, at the end of the intervals, a signal with the appropriate binary values.

The AFS 22 synchronizes the phase of y(t) to the phase of the received signal. There is thus no need to synchronize a clock to the signal, since there is no need to otherwise track the pseudo-random noise signal. This eliminates errors that in discrete time systems are attributable to clock missynchronization.

The AFSs may be used in any system that modulates a message signal with pseudo-random noise. It may thus be used in systems that simply modify the message signal by multiplying it by the pseudo-random noise or in systems that utilize more complex modulation schemes.

B. The Theory

The function L(x)=2x (mod 2) −1 that characterizes the underlying LFSR has for GF(2), i.e., binary systems, the following properties:

L(x)=−1 if x is an even integer

L(x)=1 if x is an odd integer.

The function is thus defined at integer values. The state space of the LFSR comprises the corners of an N-dimensional hypercube, which has one axis for each time delays or stage, of the register. The sequence produced by the LFSR "visits" each corner of the hypercube once during a period.

Figure 6:
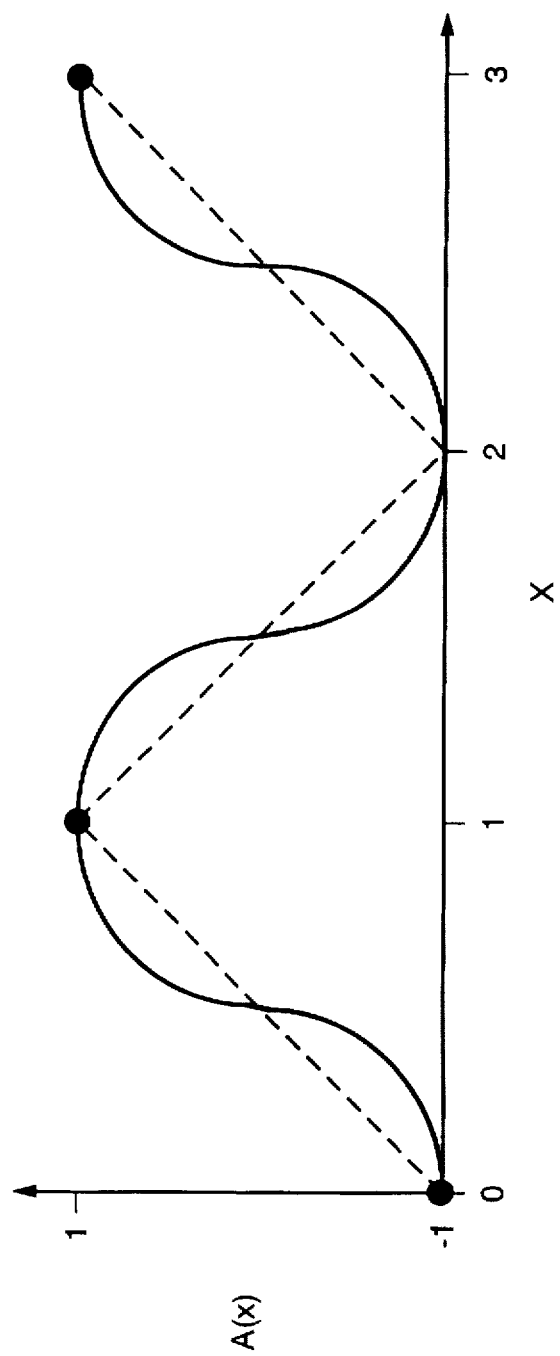
FIG. 6 is a diagram that illustrates the theory of the analog feedback system with the dotted line representing an addition modulo two function that characterizes a linear feedback shift register and the solid line representing the periodic function that characterizes the analog feedback system.

When the function L(x) is generalized to a discrete function A(x) that characterizes an analog generalization of the LFSR, the recursion relation $x_{n+1}=A(x_n)$ has stable fixed points at integer values and unstable fixed points at half-integer values. For real-valued x's, a signal produced by A(x) will relax onto the "nearest" binary-valued sequence since it is repelled by the unstable half-integer values and attracted to the stable integer values, as depicted in FIG. 6 in which the dotted line represents the addition modulo-two function L(x) and the solid line represents the periodic analog feedback shift register function A(x). The function A(x) has the following properties:

A(even integer, odd integer) = 0,1

$$\left| \frac{dA}{dx} \right|_{x(t)_{integer}} < 1$$

An example of such a function is the cosine function. It is not necessary that the function be symmetrical about the extrema, only that the slope has a magnitude of less than one about these points.

The continuous-time function $A_c(x(t))$ of the AFS has an attracting basin around periodic orbits of period $2^N-1$. In state space the corners of the associated N-dimensional hypercube, visited sequentially, constitute an attractor, with a surrounding basin of attraction dictated by the AFS characterizing expression. The AFS drives a received signal that is within one of the basins of attraction to the appropriate corners of the hybercube, and thus, to the desired integer values 1 and −1. As long as the received signal falls within these basins of attraction, the AFS can accurately determine the expected next state of the shift register. The AFS will thus entrain and produce an essentially binary-valued pseudo-random noise signal.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

The invention claimed is:

1. A communication or measurement system including:

A. a harmonic oscillator;

B. a transmitter for transmitting a modulated signal, the transmitter including a first analog feedback system that operates in accordance with the harmonic oscillator and produces a binary-valued pseudo-random noise signal; and C. a receiver for receiving the modulated message signal, the receiver including a second analog feedback system for reproducing the pseudo-random noise signal from the received modulated signal and using the noise signal to recover the message signal from the received signal, the second analog feedback system being characterized by a non-chaotic expression that is associated with the expression that governs the first analog feedback system and has a stable periodic orbit with binary integer values that correspond to the pseudo-random noise signal produced by the first analog feedback system.

2. The system of claim 1, wherein the first analog feedback system is characterized by the differential equation:

$$\frac{dx}{dt} = \epsilon_1(x - x^3) + A\Theta(z - z_c)\cos\left(\pi \frac{1 + x(t - 1/2)}{2}\right) \times \left[1 - \cos\left(\pi \sum_{i=2}^{N} a_i \frac{1 + x(t - (2i-1)/2)}{2}\right)\right]$$

where the $\alpha_i$'s are the coefficients of a maximum length polynomial, the 1-cosine factor determines the value that the signal should have at integer values of the time, t=n. $\Theta(z-z_c)$ equals 1 or 0 for $z>z_c$ or $<z_c$, respectively, and $z_c$ controls the values of t at which transitions in x(t) are allowed to occur. A controls the magnitude of the transitions, to drive x(t) to the binary values, and $\epsilon_1$ drives x(t) to the appropriate binary value after each transition.

3. The system of claim 2, wherein the second analog feedback system is characterized by the differential equation:

$$\frac{dy}{dt} = \epsilon_1(y - y^3) + A\Theta(|S(t)| - r)\cos\left(\pi \frac{1 + y(t - 1/2)}{2}\right) \times \left[1 - \cos\left(\pi \sum_{i=2}^{N} a_i \frac{1 + y(t - (2i-1)/2)}{2}\right)\right] + \epsilon_2(S(t) - y(t))$$

where the A, $\epsilon_1$, and the $\alpha_i$'s are the identical to the those in the first analog feedback system, $\epsilon_2$ is a coupling factor that controls how much of the received signal is coupled into y(t) and r controls when the transitions in y(t) are allowed to occur.

4. The system of claim 2, wherein the paramter $z_c$ is set to a value relatively close to 1, so that transitions in the signal x(t) occur in intervals that include the integer times t=n.

5. An analog feedback subsystem for use in a communication or measurement system, the subsystem including:

A. a first analog feedback system that produces a pseudo-random binary-valued signal with period $2^N-1$, the first analog feedback system being characterized by a first differential equation; and B. a second analog feedback system that has a stable periodic orbit with binary integer values that correspond to the pseudo-random noise signal produced by the first analog feedback system the second analog feedback system being characterized by a second differential equation that is related to the first differential equation.

6. The system of claim 5, wherein the first analog feedback system is characterized by the differential equation:

$$\frac{dx}{dt} = \epsilon_1(x - x^3) + A\Theta(z - z_c)\cos\left(\pi \frac{1 + x(t - 1/2)}{2}\right) \times \left[1 - \cos\left(\pi \sum_{i=2}^{N} a_i \frac{1 + x(t - (2i - 1)/2}{2}\right)\right]$$

where the $\alpha_i$'s are the coefficients of a maximum length polynomial, the 1-cosine factor determines the value that the signal should have at integer values of the time, t=n, $\Theta(z-z_c)$ equals 1 or 0 for z $z_c$ or $z_c$, respectively, and $z_c$ controls the values of t at which transitions in x(t) are allowed to occur, A controls the magnitude of the transitions, to drive x(t) to the binary values, and $\epsilon_1$ drives x(t) to the appropriate binary value after each transition.

7. The system of claim 6, wherein the second analog feedback system is characterized by the differential equation:

$$\frac{dy}{dt} = \epsilon_1(y - y^3) + A\Theta(|S(t)| - r)\cos\left(\pi \frac{1 + y(t - 1/2)}{2}\right) \times \left[1 - \cos\left(\pi \sum_{i=2}^{N} a_i \frac{1 + y(t - (2i - 1)/2}{2}\right)\right] + \epsilon_2(S(t) - y(t))$$

where the A, $\epsilon_1$, and the $\alpha_i$'s are the identical to the those in the first analog feedback system, $\epsilon_2$ is a coupling factor that controls how much of the received signal is coupled into y(t) and r controls when the transitions in y(t) are allowed to occur.

8. The system of claim 2, wherein the paramter $z_c$ is set to a value relatively close to 1, so that transitions in the signal x(t) occur in intervals that include the integer times t=n.

9. A transmitter for a communication or measurement system, the transmitter including:

A. a harmonic oscillator; and

B. means for transmitting a modulated signal, said means including an analog feedback system that operates in accordance with the harmonic oscillator and produces a binary-valued pseudo-random noise signal, the analog feedback system being characterized by a differential function that has at binary integer values stable periodic orbits that are attractors.

10. A receiver for a communication or measurement system, the receiver including:

A. means for receiving a modulated signal, the signal including a message signal that is modulated by a binary-valued pseudo-random noise signal; and B. an analog feedback system for reproducing the pseudo-random noise signal from the received modulated signal and using the noise signal to recover the message signal from the received signal, the analog feedback system being characterized by a non-chaotic expression that has at binary integer values that correspond to the pseudo-random noise signal stable periodic orbits that are attractors.

* * * * *